(12) United States Patent (10) Patent No.: US 7,542,667 B2
Chen (45) Date of Patent: Jun. 2, 2009

(54) CAMERA LENS MODULE WITH A PIEZOELECTRIC-DRIVEN ZOOM

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 452 days.

(21) Appl. No.: 11/303,354

(22) Filed: Dec. 16, 2005

(65) Prior Publication Data

US 2006/0140609 A1 Jun. 29, 2006

(30) Foreign Application Priority Data

Dec. 24, 2004 (CN) .................. 2004 1 0091852

(51) Int. Cl.
G03B 17/00 (2006.01)
(52) U.S. Cl. ..................................... 396/85
(58) Field of Classification Search .............. 396/85, 396/72
See application file for complete search history.

(56) References Cited

U.S. PATENT DOCUMENTS

| 4,291,958 | A | 9/1981 | Frank et al. | |
| 4,303,324 | A | 12/1981 | Marcus | |
| 6,249,093 | B1 * | 6/2001 | Takahata et al. | ............. 318/129 |
| 6,566,790 | B1 * | 5/2003 | Serita | ......................... 310/328 |
| 2002/0167605 | A1 * | 11/2002 | Akimoto et al. | ............. 348/374 |

FOREIGN PATENT DOCUMENTS

| CN | 1545638 A | 11/2004 |
| JP | 6-133567 | 5/1994 |
| JP | 7-13061 | 1/1995 |
| JP | 8-114736 A | 5/1996 |
| JP | 11-194257 | 7/1999 |

* cited by examiner

Primary Examiner—Christopher Mahoney
(74) Attorney, Agent, or Firm—Zhigang Ma

(57) ABSTRACT

A digital camera unit (100) is provided. The digital camera unit includes a barrel (1), a fixed lens member (2), a movable lens member (3), a piezoelectric element (6), an image sensor (9), and a power supply (100). The barrel is fixed relative to a body of the digital camera unit. The fixed lens member is fixed in the barrel. The movable lens member is slidably assembled in the barrel. The piezoelectric element is attached to the movable lens member and configured to fixed relative to the body of the digital camera unit, the piezoelectric element being configured, via control of current thereto, for selectably positioning the movable lens member in the barrel. The image sensor is fixed relative to the body of the digital camera unit and is arranged at one side of the barrel, facing the lens members.

15 Claims, 2 Drawing Sheets

CAMERA LENS MODULE WITH A PIEZOELECTRIC-DRIVEN ZOOM

BACKGROUND OF THE INVENTION

1. Field of the Invention

The present invention generally relates to camera lens modules and, more particularly, to a zoom camera lens module.

2. Discussion of the Related Art

With the rapid development of multimedia technology, digital devices such as digital still cameras ("still cameras") and digital video cameras ("video cameras") have become wide-spread in many countries in recent years. Consumers expect such still cameras and video cameras to have a compact size, while still being capable of providing high imaging quality. Similar to film-based cameras, the ability to zoom is a considered to be a necessary function for achieving high image quality over a variety of imaging distances. Generally, there are two kinds of zoom methods, an optical zoom and a digital zoom. Imaging quality tends to relatively poor when digital zooming is relied upon, while imaging quality is generally nicer when using an optical zoom. In order to satisfy a market demand, camera lens of digital cameras should have an optical zoom function.

One kind of camera lens is disclosed in U.S. Pat. No. 4,291,958, the contents of which are hereby incorporated by reference thereto. The camera lens includes a fixed barrel, a movable barrel, two links, and two bender elements. The fixed barrel and the movable barrel each has a lens group therein and are coaxial. The bender elements are of cantilever fashion and are made of piezoelectric materials. One end of each bender element is fixed to an electric device and connected to a power supply. Another end of each bender element is connected to one link. The bender elements are approximately parallel to an axis of the two barrels. The links connect the bender elements and the movable barrel. In an original state (i.e. the when the power supply does not supply electricity), one bender element and one corresponding link forms an angle smaller than 90° therebetween. When the power supply supplies electricity to the bender elements, the bender elements deform under the effect of piezoelectricity. It results that the angle between the elements and the links changes, and the movable barrel thereby moves. Thus, the camera lens zooms or focuses.

However, the size of the bender elements and links are so large that the camera lens unit, as a whole, is fairly big. Therefore, digital cameras with such camera lens will be very large, and consumers cannot be expected to enjoy these bulky digital devices. In addition, the bender elements and links are very long, so a rigidity of the camera lens is less than optimal. Thus, the camera lens can be unsteady, which can lead to bad imaging.

What is needed, therefore, is a camera lens module having optical zoom function that has a small size and nice rigidity.

SUMMARY OF THE INVENTION

A digital camera unit includes a barrel, a fixed lens member, a movable lens member, a piezoelectric element, an image sensor and an power supply. The barrel is configured to fixed relative to a body of the digital camera unit. The fixed lens member is mounted in the barrel. The movable lens member is slidably assembled in the barrel. The piezoelectric element is attached to the movable lens member and configured to fixed relative to the body of the digital camera unit. The piezoelectric element is configured for selectably positioning the movable lens member in the barrel. The image sensor is configured for being fixedly mounted relative to the body of the digital camera unit, the image sensor being arranged at one side of the barrel. The image sensor faces the fixed lens member and the movable lens member. The image sensor is configured for outputting image data received thereby. The power supply is configured for supplying a selectable current to the piezoelectric element. The distance separates the movable lens member and the image sensor being dependent upon the amount of current supplied to the piezoelectric element.

A camera lens module configured for use in a camera unit includes a barrel, a fixed lens member, a movable lens member and a piezoelectric element. The barrel is configured to fixed relative to a body of the camera unit. The fixed lens member is mounted in the barrel. The movable lens member is slidably assembled in the barrel. The piezoelectric element is attached to the movable lens member and configured to fixed relative to the body of the camera unit. The piezoelectric element is configured for selectably positioning the movable lens member in the barrel.

The digital camera unit and the camera lens module both have a zoom function, which is driven by the piezoelectric element forcing the movable lens to move. In addition, the piezoelectric element is very small and does not occupy a large space, so the camera lens module has a small size and nice rigidity.

Other advantages and novel features of preferred embodiments of the present zoom camera lens module will become more apparent from the following detailed description when taken in conjunction with the accompanying drawings.

BRIEF DESCRIPTION OF THE DRAWINGS

Many aspects of the present camera lens module can be better understood with reference to the following drawings. The components in the drawings are not necessarily to scale, the emphasis instead being placed upon clearly illustrating the principles of the camera lens module. Moreover, in the drawings, like reference numerals designate corresponding parts throughout the several views.

DETAILED DESCRIPTION OF PREFERRED EMBODIMENTS

Figure 1:
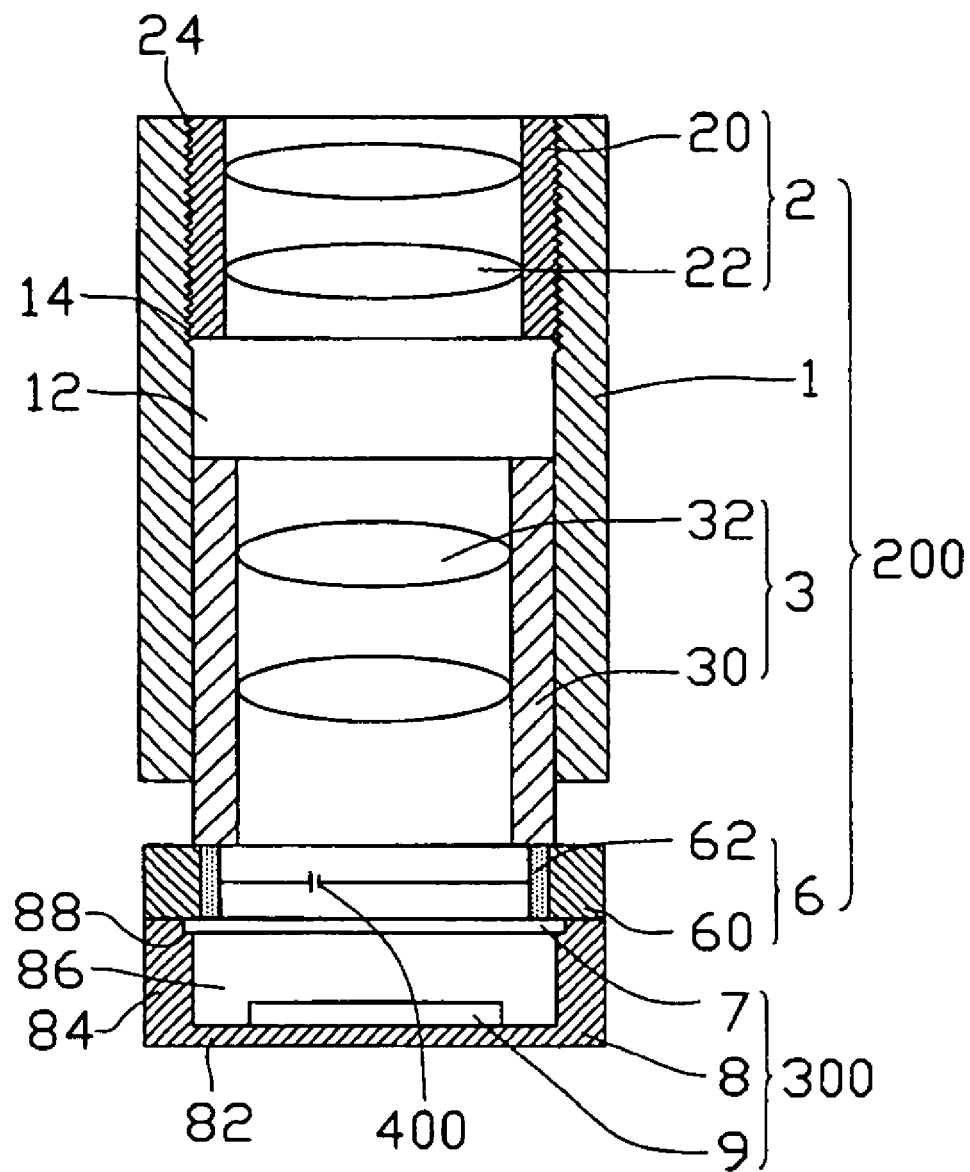
FIG. 1 is an assembled, cross-section view of a camera lens module, in accordance with a preferred embodiment.

Referring to FIG. 1, a digital camera 100 incorporates a camera lens module 200, which includes a barrel 1, a fixed lens 2, a movable lens 3, and a piezoelectric element 6; and an image sensor package 300, which includes a cover 7, a holder 8, and an image sensor 9; and a power supply 400.

The barrel 1 is hollow and cylinder-shaped and has a through hole 12 therein. A part of the inside wall of the barrel 1 defines an inner screw thread 14. The other part of the inside wall of the barrel 1 is smooth.

The fixed lens member 2 includes a fixed drawtube 20 and a first lens group 22. The fixed drawtube 20 is hollow and cylinder-shaped. The outside wall of the fixed drawtube 20 has an outside screw thread 24 thereon. The first lens group 22 includes one or more lenses (not individually labeled) mounted in the fixed drawtube 20. The fixed lens member 2 is assembled in the barrel 1. The outside screw thread 24 threadingly mates with the inner screw thread 14 of the barrel 1.

The movable lens member 3 includes a movable drawtube 30 and a second lens group 32. The movable drawtube 30 is hollow and cylinder-shaped. The second lens group 32 includes one or more lenses (not individually labeled) mounted in the movable drawtube 30. The movable lens member 3 is slidably assembled in the barrel 1 and engages with the smooth part of the inside wall of the barrel 1. The movable lens member 3 partly protrudes out of the barrel 1.

The piezoelectric element 6 includes a substrate 60 and a piezoelectric portion 62. The substrate 60 is hollow and cylinder-shaped. The piezoelectric portion 62 is arranged on the inside surface of the substrate 60. The piezoelectric portion 62 can also or alternatively be positioned on the outside surface of the substrate 60. The piezoelectric portion 62 can be made, e.g., of any of $ZnO_x$ (zinc oxide), $LiNbO_3$ (lithium niobate), and $LiTaO_3$ (lithium tantalate), or another piezoelectric ceramic material. One end of the movable lens member 3 is fixed to one end of the piezoelectric element 6. The substrate 60 advantageously is made of a suitably elastic material, thereby facilitating the changes in length of the piezoelectric portion 62 and providing adequate mechanical support for the piezoelectric portion 62. Beneficially, an approximate thickness of the piezoelectric portion 62 is about 10~1000 nm (nanometer), preferably about 50~500 nm, especially to minimize the overall size (weight and/or volume) occupied thereby.

The cover 7 is a piece of glass or another transparent solid material. The cover 7 is mounted on the holder 8 to prevent dust from falling in or otherwise reaching the interior of the holder 8.

The holder 8 is hollow and cylinder-shaped. The holder 8 includes a base plate 82 and a sidewall 84. The base plate 82 and the sidewall 84 together establish a cavity 86. Opposite to the base plate 82, a sidestep 88 is defined in the holder 8. The cover 7 is set on the sidestep 88 of the holder 8.

The image sensor 9 is mounted on the base plate 82 of the holder 8. The image sensor 9 is electrically connected to a PCB (print circuit board) (not shown), thereby allowing the digital processing of the image data collected by the image sensor 9.

The power supply 400 supplies direct current to the piezoelectric element 6, as well as the image sensor 9 and the PCB. The anode and the cathode are respectively connected to two different positions of the piezoelectric portion 62. The piezoelectric portion 62 will variably deform, according to the voltage/current of the power supply 400.

When assembling the camera lens module, the first lens group 22 and the second lens group 32 are respectively mounted in the fixed drawtube 20 and the movable drawtube 30 to form the fixed lens member 2 and the movable lens member 3. Then, the fixed lens member 2 is inserted into the barrel 1. The outside screw thread 24 of the fixed drawtube 20 mates with the inner screw thread 14 of the barrel 1. The fixed lens member 2 is finally fixed in the barrel 1 by glue/adhesive, by fusion/brazing/soldering, and/or by a mechanical means. Inserted into the barrel 1, the movable lens member 3 can slide relative to the barrel 1 along an axis of the barrel 1. The cover 7, the holder 8, and the image sensor 9 are assembled into the image sensor package 300 beforehand. Meanwhile, the power supply 400 is connected to the piezoelectric portion 62 of the piezoelectric element 6. Finally, the piezoelectric element 6 is assembled between the barrel 1 and the holder 8. One end of the piezoelectric element 6 is touched the movable lens member 3, with one corresponding end of piezoelectric portion 62 being fixed to the movable lens member 3 and an opposite end of the piezoelectric element 6 being permanently attached to the holder 8 and the cover 7. Thereby, the camera module 200 is assembled, as a whole one.

Figure 2:
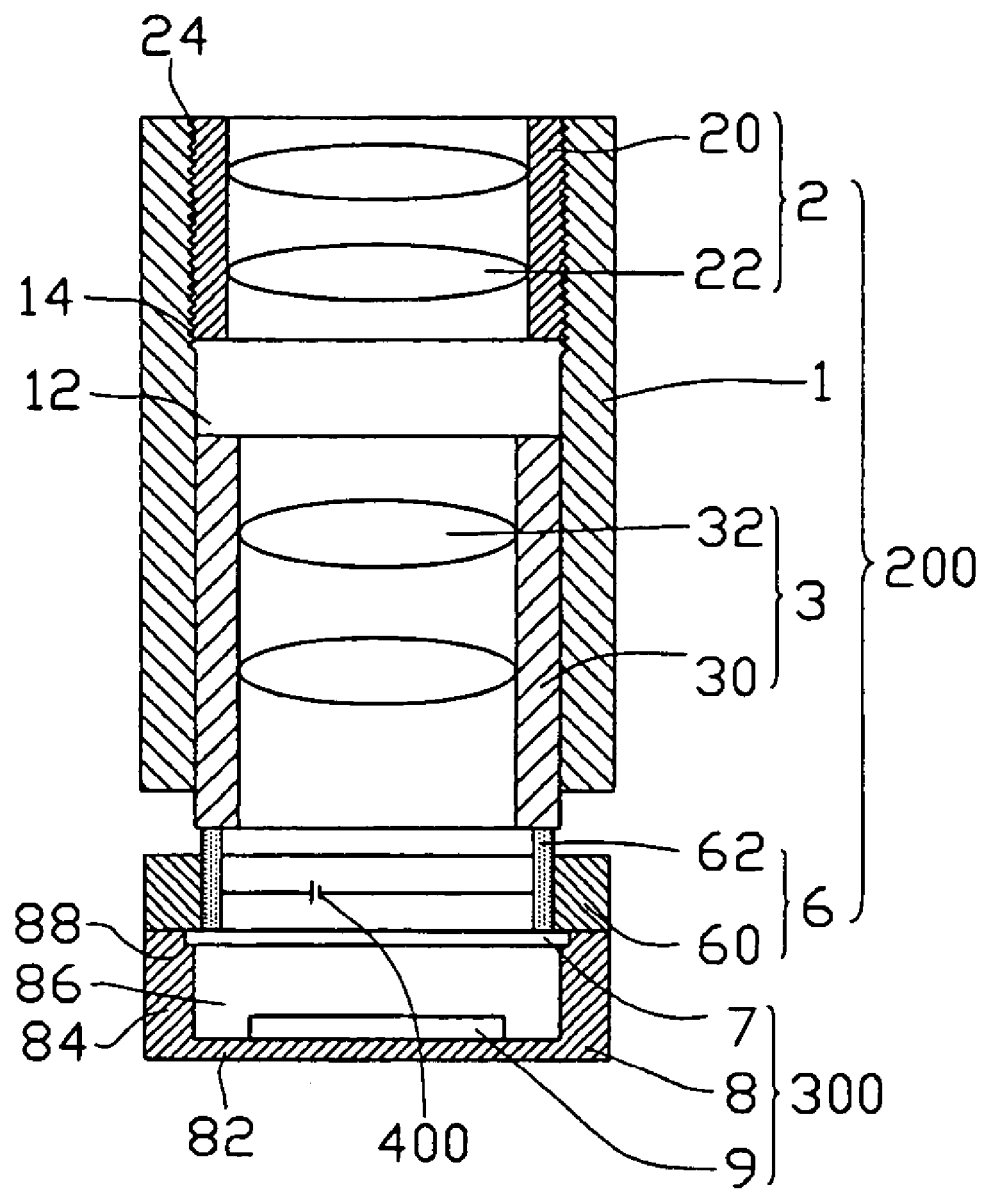
FIG. 2 is similar to FIG. 1, but showing another focusing state of the camera lens module.

After the camera lens module is assembled following the above-described steps, the camera lens module 200 is applied in a digital device, such as a digital camera or a mobile phone. The barrel 1 and the holder 8 are both fixed relative to the body of the digital device. When the power supply 400 electrifies the piezoelectric element 6, the piezoelectric portion 62 will deform according to its piezoelectric characteristics. Thereby, the piezoelectric portion 62 will extend or compress, and the substrate 60 will extend or compress together with the piezoelectric 62, especially when the substrate 60 is elastic, bringing the movable lens member 3 upward or downward. A distance between the fixed lens member 2 and the movable lens member 3 changes, and a distance between the first lens group 22 and the second lens group 32 correspondingly changes, as shown in FIG. 2. Accordingly, a focus of the camera lens module 200 changes. If the voltage of the power supply 400 should changes, the amount of deformation of the piezoelectric portion 62 would differ, resulting in a change of the distance between the first and second lens member 2, 3. As such, the focus of the camera lens module 200 would change to a different length.

In alternative embodiment, the number of lens members is not limited to two, and it can be more than two, as long as there is at least one lens member movable among the various lens members. For compactness, the fixed lens member 2 could be eliminated, thereby relying solely on one or more movable lens members 3. The lenses of lens groups 22, 32 can each be a glass lens or plastic lens. The substrate 60 of the piezoelectric element 6 can be omitted, with the piezoelectric element 6 being made entirely of one or more piezoelectric materials. The piezoelectric element 6 is not limited to being cylinder-shaped, and the piezoelectric element 6 could instead be made up of several block-shaped piezoelectric bodies arranged on the holder 8. The piezoelectric element 6 could potentially be not fixed to the holder 8, but fixed to the barrel 1 or the digital device directly, with the image sensor package 300 being attached to the barrel 1 or the digital device by another means (i.e., via another part). It is to be further understood that the camera lens module 200 and the power supply 400 could also be used in film-based cameras (not shown) employing electronically controlled focus systems.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A digital camera unit, comprising:
a barrel configured to be fixed relative to a body of the digital camera unit;
a fixed lens member mounted in the barrel;
a movable lens member slidably assembled in the barrel;
a piezoelectric element attached to the movable lens member and configured to be fixed relative to the body of the digital camera unit, the piezoelectric element being configured for selectably positioning the movable lens member in the barrel, the piezoelectric element including a hollow, cylindrical substrate and a piezoelectric portion, the piezoelectric portion being coaxial with the substrate;
an image sensor configured for being fixedly mounted relative to the body of the digital camera unit, the image sensor being arranged at one side of the barrel, the image sensor facing the fixed lens member and the movable lens member, the image sensor being configured for outputting image data received thereby; and a power supply configured for supplying a selectable direct current to the piezoelectric element, an anode and a cathode being respectively connected to two different positions on the piezoelectric portion, the distance separating the movable lens member and the image sensor being dependent upon the amount of current supplied to the piezoelectric element.

2. The digital camera unit as claimed in claim 1, wherein the digital camera unit further comprises a cover and a holder, the holder is used to received the image sensor, the cover being positioned upon the holder.

3. The digital camera unit as claimed in claim 2, wherein the cover is a transparent material, the holder being comprised of a base plate and a sidewall, the image sensor being mounted on the base plate.

4. The digital camera unit as claimed in claim 3, wherein the sidewall is hollow cylinder-shaped, the base plate and the sidewall together defining a cavity, a sidestep is defined in the sidewall opposite to the base plate, the cover being received in the sidestep, the piezoelectric element being positioned adjacent to at least one of the cover and the sidewall.

5. The digital camera unit as claimed in claim 1, wherein the barrel is hollow and cylinder-shaped, a part of an inside wall of the barrel having an inner screw thread defined therein, the other part of the inside wall of the barrel being smooth.

6. The digital camera unit as claimed in claim 5, wherein the fixed lens member includes a fixed drawtube and a first lens group mounted in the fixed drawtube, the fixed drawtube being hollow and cylinder-shaped, and an outside wall of the fixed drawtube having an outside screw thread therein, the outside screw thread engaging with the inner screw thread of the barrel.

7. The digital camera unit as claimed in claim 5, wherein the movable lens member includes a movable drawtube and a second lens group mounted in the movable drawtube, the movable drawtube being hollow and cylinder-shaped.

8. The digital camera unit as claimed in claim 7, wherein the movable lens member is slidably assembled in the barrel and engages with the smooth part of the inside wall of the barrel, the movable lens member partly protruding out of the barrel.

9. The digital camera unit as claimed in claim 1, wherein the piezoelectric portion being arranged on an inside surface of the substrate.

10. The digital camera unit as claimed in claim 1, wherein the piezoelectric portion is made of any of a zinc oxide, lithium niobate, and lithium tantalite.

11. The digital camera unit as claimed in claim 1, wherein the substrate is elastic, and a thickness of the piezoelectric portion is about 10~1000 nanometers.

12. A camera lens module configured for use in a camera unit, comprising:

a barrel configured to be fixed relative to a body of the camera unit, the barrel being hollow and cylinder-shaped, a part of an inside wall of the barrel having an inner screw thread defined therein, the other part of the inside wall of the barrel being smooth;

a fixed lens member mounted in the barrel, the first member including a fixed drawtube and a first lens group mounted in the fixed drawtube, the fixed drawtube being hollow and cylinder-shaped, and an outside wall of the fixed drawtube having an outside screw thread therein, the outside screw thread engaging with the inner screw thread of the barrel;

a movable lens member sidably assembled in the barrel; and a piezoelectric element attached to the movable lens member and configured to be fixed relative to the body of the camera unit, the piezoelectric element being configured for selectably positioning the movable lens member in the barrel, the piezoelectric element including a hollow, cylindrical substrate and a piezoelectric portion, the piezoelectric portion being coaxial with the substrate.

13. The camera lens module as claimed in claim 12, wherein the movable lens member includes a movable drawtube and a second lens group mounted in the movable drawtube, the movable drawtube being hollow and cylinder-shaped.

14. The camera lens module as claimed in claim 13, wherein the movable lens member is slidably assembled in the barrel and engages with the smooth part of the inside wall of the barrel, the movable lens member partly protruding out of the barrel.

15. The camera lens module as claimed in claim 12, wherein the piezoelectric portion being arranged on an inside surface of the substrate.

* * * * *